United States Patent Office 3,704,292
Patented Nov. 28, 1972

3,704,292
SEMICARBAZIDOPENICILLINS
Milton Wolf, West Chester, James L. Diebold, Havertown, Peter B. Russell, Villanova, and Stanley C. Bell, Penn Valley, Pa., assignors to American Home Products Corporation, New York, N.Y.
No Drawing. Filed Dec. 17, 1969, Ser. No. 885,999
Int. Cl. C07d 99/16
U.S. Cl. 260—239.1
8 Claims

ABSTRACT OF THE DISCLOSURE

Novel substituted semicarbazidopenicillanic acid derivatives have been prepared which are useful antibacterial agents.

DESCRIPTION OF THE INVENTION

The invention is concerned with novel antibacterial compounds of Formula I:

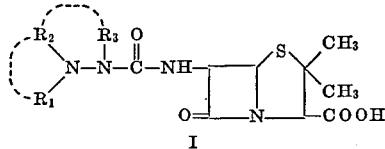

wherein $R_1$ is selected from the group consisting of (lower)alkyl, phenyl, halophenyl, (lower)alkoxyphenyl, (lower)alkylphenyl, (lower)alkylphen(lower)alkyl, lower (alkoxy)phen(lower)alkyl, halophen(lower)alkyl, phen (lower)alkyl; 2-pyridyl, 3-pyridyl, 4-pyridyl, 2-imidazolyl and 4-imidazolyl;

$R_2$ is selected from the group consisting of (lower) alkyl, (lower)alkanoyl, phenyl, halophenyl, (lower) alkoxyphenyl, (lower)alkylphenyl, phen(lower)alkanoyl, halophen(lower)alkanoyl, (lower)alkylphen(lower)alkanoyl, benzoyl, halobenzoyl, (lower)alkylbenzoyl, (lower) alkoxybenzoyl, isonicotinoyl, 2-pyridyl, 3-pyridyl, 4-pyridyl, 2-imidazolyl, 4-imidazolyl, 2-pyrrolyl, 3-pyrrolyl, phen(lower)alkyl, halophen(lower)alkyl, (lower)alkylphen(lower)alkyl, (lower)alkoxyphen(lower)alkyl $R_4SO_2$— wherein $R_4$ is selected from the group consisting of (lower)alkyl, phenyl, halophenyl, (lower)alkoxyphenyl, (lower)alkylphenyl, phen(lower)alkyl, 2-pyridyl, 3-pyridyl and 4-pyridyl;

$R_1$ and $R_2$ may be concatenated to form a radical selected from the group consisting of piperidino, morpholino, piperazino, pyrrolidino and imidazolino; when $R_1$ and $R_2$ are not concatenated, $R_2$ and $R_3$ may be concatenated to form a heterocyclic structure selected from the group consisting of perhydro pyrazole and perhydro pyridazine.

$R_3$ is selected from the group consisting of hydrogen, (lower)alkyl, (lower)alkanoyl, phen(lower)alkanoyl, benzoyl, halobenzoyl, (lower)alkoxybenzoyl, halophen (lower)alkanoyl, (lower)alkylphen(lower)alkanoyl, (lower)alkylphen(lower)alkanoyl (lower)alkoxyphen(lower)alkanoyl, (lower)alkylbenzoyl $R_1$ and $R_2$ may both be direct bonds attached to a single radical selected from the group consisting of (lower) alkylidene, benzylidene, phen(lower)alkylidene and substituted forms thereof, and nontoxic salts thereof such as sodium, potassium, the ammonium salts, e.g., salts of such nontoxic amines such as triethylamine, procaine, dibenzylamine, N-ethylpiperazine, etc.

As used herein and in the appended claims the term (lower)alkyl is used to include straight and branched chain hydrocarbon radicals containing from one to about six carbon atoms such as methyl, ethyl, n-propyl, i-propyl, n-butyl, n-pentyl, etc. The terms halo and halogen are used to include chlorine, fluorine, bromine and iodine. By the term (lower)alkanoyl is meant to include acyl groups containing one to about six carbon atoms such as formyl, acetyl, propionyl, butyryl, etc. The term (lower)alkoxy is used herein to include groups such as methoxy, ethoxy, propoxy, butoxy and the like.

The intermediate trimethylsilylesters of the semicarbazidopenicillanic acid compounds of Formula I are also within the scope of the invention.

The novel compounds of this invention may be prepared by reacting trimethylsilyl-6-isocyanatopenicillanate with the appropriate hydrazine derivative

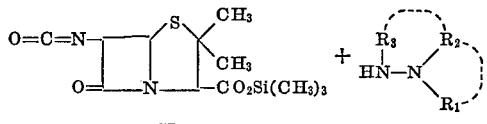

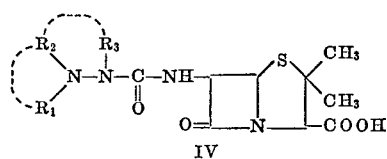

wherein $R_1$, $R_2$ and $R_3$ are the same as hereinabove described.

The compounds wherein $R_2$ and $R_3$ are concatenated are prepared by selecting as the hydrazine reactant, an appropriate cyclic hydrazine.

The hydrazines are reacted with the trimethylsilylester of 6-isocyanatopenicillanic acid in an anhydrous organic solvent such as toluene, benzene, methylene chloride, etc. If even a very small quantity of water is present, there will be a tendency of the trimethylsilylester group to hydrolize off the penicillanic acid moiety and not perform its function of "blocking" the 2-carboxylic acid position. This would result in a degradation of the penicillanic acid moiety and prevent the formation of the novel semicarbazide penicillins of the invention. After the hydrazines have reacted with the trimethylsilyl-6-isocyanato-penicillanate according to the reaction set forth above, the novel intermediates of the invention may be isolated by evaporating the solvent in vacuo. Optionally the free semicarbazidopenicillanic acid compounds may be prepared directly by evaporating the organic solvent from the reaction mixture in a stream of air or by adding water to the reaction mixture. The moisture content of the air is sufficient to cause the trimethylsilyl group to hydrolyze off and yield the semicarbazide penicillins.

The intermediate compound of Formula II may be prepared as follows:

A solution of 60 mmoles of 6-aminopenicillanic acid trimethylsilyl-ester in 250 ml. of toluene is slowly added dropwise, in a nitrogen atmospere, to a well stirred mixture of 132 mmoles of triethylamine, about 150 mmoles of phosgene and 90 ml. of toluene; the temperature of the reaction mixture is kept below —40° C. Stirring is continued for 3 hours; the reaction mixture is then filtered under nitrogen at —40° C. The temperature is slowly allowed to rise from —40° C. while the combined filtrates are evaporated under reduced pressure to a final volume of 70 ml. The solution contains about 0.71 mmole of the trimethylsilylester of 6-isocyanatopenicillanic acid, per ml. of solution. The novel compounds of the invention are antibacterial agents useful in treating bovine mastitis and other infections amenable to therapy with penicillanic acid derivatives such as benzylpenicillin. They are also useful as growth promoters for ruminant animals such as cattle. The compounds of the invention are also useful for the inhibition of Staph. aureus, Smith at a concentration of less than 150 micrograms/ml. when applied in an aqueous vehicle.

The following examples are added to illustrate but not to limit the scope of the invention.

EXAMPLE 1

6-[3-(dimethylamino)ureido] penicillanic acid, hemihydrate

To a solution of 2.29 ml. (0.032 m.) of N,N-dimethylhydrazine, 2 drops of pyridine and 50 ml. of dried toluene is slowly added 20 ml. of (0.0218 m.) of trimethylsilyl 6-isocyanato penicillanate in toluene. The solution is stirred for 1 hr. and then evaporated in a stream of air. The residue is washed with ethyl ether and recrystallized from acetone.

Analysis.—Calcd. for $C_{11}H_{18}SN_4O_3 \cdot 0.5H_2O$ (percent): C, 42.42; H, 6.16; N, 18.00; S, 10.30; $H_2O$, 2.9. Found (percent): C, 42.46; H, 6.28; N, 17.30; S, 10.88; $H_2O$, 1.11.

EXAMPLE 2

6-(3-benzamidoureido)penicillanic acid

To a slurry of 4.8 g. (0.0354 m.) of benzhydrazide, 2 drops of pyridine and 50 ml. of toluene is slowly added 25 ml. (0.0272 m.) of trimethylsilyl 6-isocyanatopenicillanate in toluene. The solution is stirred at 25° C. for 2 hours and then evaporated in a stream of air. The residue is reprecipitated from a dilute hydrochloric solution.

EXAMPLE 3

6-[3-(isonicotinamido)-ureido] penicillanic acid, N-ethylpiperdine salt, hemihydrate To a slurry of 3.58 g. (0.0262 m.) of isonicotinic acid hydrazide, 2 drops of pyridine and 50 ml. of toluene is slowly added 20 ml. (0.0218 m.) of trimethylsilyl 6-isocyanatopenicillanate in toluene. Forty ml. of dioxane is added after 1 hr. of stirring to make the mixture homogeneous. The solution is stirred for 3 hours and then evaporated in a stream of air. The residue is washed with ethyl ether to give a solid. The N-ethyl piperidine salt is formed in tetrahydrofuran.

Analysis.—Calcd. for $C_{15}H_{17}SN_5O_5 \cdot C_7H_{15}N \cdot 0.5H_2O$ (percent): C, 52.68; H, 6.63; N, 16.76; $H_2O$, 1.8. Found (percent): C, 52.18; H, 6.15; N, 17.17; $H_2O$, 4.17.

EXAMPLE 4

6-[3-(4-methyl-1-piperazinyl)ureido]penicillanic acid

To a solution of 2.31 g. (0.0218 m.) of 1-amino-4-methylpiperazine, 2 drops of pyridine and 50 ml. of toluene is slowly added 20 ml. (0.0218 m.) of trimethylsilyl 6-isocyanatopenicillanate in toluene. The solution is stirred for 18 hours and then evaporated in a stream of air to give 6-[3-(4-methyl-1-piperazinyl)ureido] penicillanic acid.

EXAMPLE 5

6-[3-benzoyl-3-(isopropylideneamino)ureido] penicillanic acid

To a slurry of 1.9 g. (0.0108 m.) of isopropylidene benzhydrazide, 2 drops of pyridine and 15 ml. of toluene is slowly added 10 ml. (0.0108 m.) of trimethylsilyl 6-isocyanatopenicillanate. The solution is stirred for 18 hours and then evaporated in a stream of air. The residue is extracted with ethyl ether and the 6-[3-benzoyl-3-(isopropylideneamino)ureido] penicillanic acid precipitated from this solution by addition of hexane.

EXAMPLE 6

6-[3-(p-toluenesulfonamino)ureido]-pencillanic acid

To a solution of 4.86 g. (0.0262 m.) of p-toluenesulfonylhydrazide, two drops of pyridine and 40 ml. of dioxane is slowly added 20 ml. (0.0218 m.) of trimethylsilyl 6-isocyanatopencillanate in toluene. The solution is stirred for 3 hours at 25° C. and then evaporated in a stream of air. The residue is washed with $Et_2O$ and reprecipitated from a dilute HCl solution.

Analysis.—Calcd. for $C_{16}H_{20}S_2N_4O_6 \cdot 0.85\ H_2O$ (percent): C, 43.30; H, 4.93; N, 12.63; $H_2O$, 3.45. Found (percent): C, 43.61; H, 4.43; N, 12.84; $H_2O$, 3.49.

EXAMPLE 7

The following compounds of the invention are prepared according to the procedure of Example 1 by substituting the appropriate hydrazine:

| $R_1$ | $R_2$ | $R_3$ |
|---|---|---|
| —$C_2H_5$ | —$C_2H_5$ | H [1] |
| —$nC_3H_7$ | —$nC_3H_7$ | —$CH_3$ |
| —C$_6$H$_5$ | —C(O)—$CH_3$ | —$C_2H_5$ |
| —C$_6$H$_4$—Cl | —C$_6$H$_5$ | —$nC_3H_7$ |
| —C$_6$H$_4$—$OCH_3$ | —C$_6$H$_4$—Br | —$nC_4H_9$ |
| —C$_6$H$_4$—$CH_3$ | —C$_6$H$_4$—$OCH_3$ | —C$_6$H$_5$ |
| —C$_6$H$_4$—F | —C$_6$H$_4$—$OC_2H_5$ | —H |
| —C$_6$H$_4$—I | —C$_6$H$_4$—$C_2H_5$ | —C(O)—$CH_3$ |

See footnote at end of table.

| R₁ | R₂ | R₃ |
|---|---|---|
| —CH₂—C₆H₅ | —C(O)—CH₂—CH₃ | —C(O)—C₆H₅ |
| —CH₂—CH₂—C₆H₅ | —CH₂—C₆H₅ | —C(O)—CH₂—CH₃ |
| —CH₂—CH₂—CH₂—C₆H₅ | —CH₂—CH₂—CH₂—C₆H₅ | —C(O)—CH₂—C₆H₅ |
| —CH₂—C₆H₄—Cl | —CH₂—C₆H₄—Cl | —C(O)—C₆H₄—Cl |
| —CH₂—C₆H₄—Br | —C(O)—C₆H₅ | —C(O)—C₆H₄—CH₃ |
| —C₆H₄—OCH₂CH₂OCH₃ | —C₆H₄—OCH₂CH₂—CH₃ | H |
| —C₆H₄—CH₂—CH₂—CH₃ | —C₆H₄—CH₂—CH₂—CH₃ | —C(O)—CH₂—C₆H₄—Cl |
| —CH₂—CH₂—C₆H₄—Cl | —CH₂—CH₂—C₆H₄—Cl | —C(O)—CH₂—C₆H₅ |
| pyridyl | CH₃ | —H |
| pyridyl | C₂H₅ | —H |
| pyridyl | CH₃ | H |
| imidazolyl | CH₃ | H |
| triazolyl | CH₃ | H |
| —CH₃ | pyrrolyl-NH | H |
| —C₂H₅ | pyrrolyl-NH | H |
| —CH₃ | —SO₂—CH₃ | —CH₃—C |
| —C₂H₅ | —SO₂—C₆H₅ | —CH₃ |
| —CH₃ | —SO₂—C₆H₄—CH₃ | —H |
| —CH₃ | —SO₂—C₆H₄—Cl | —H |
| —C₂H₅ | —SO₂—C₆H₄—OCH₃ | —H |
| —CH₃ | —SO₂—CH₂—C₆H₄— | —H |
| —C₆H₅ | —SO₂—pyridyl | —H |

See footnote at end of table.

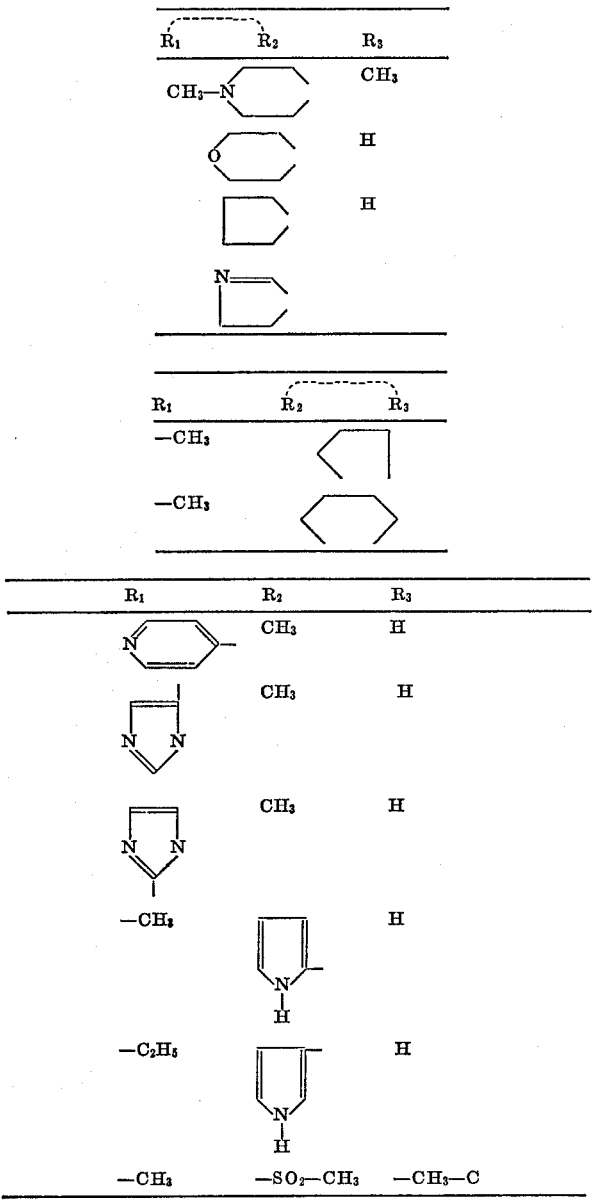

¹ Potassium salt.

We claim:
1. A compound of the formula

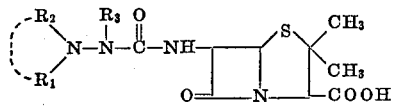

wherein $R_1$ is selected from the group consisting of (lower)alkyl, phenyl, halophenyl, (lower)alkoxyphenyl, (lower)alkylphenyl, (lower)alkyphen(lower)alkyl, lower (alkoxy)phen(lower)alkyl, halophen(lower)alkyl, phen(lower)alkyl, 2-pyridyl, 3-pyridyl, 4-pyridyl, 2-imidazolyl and 4-imidazolyl; $R_2$ is selected from the group consisting of (lower)alkyl, (lower)alkanoyl, phenyl, halophenyl, (lower)alkoxyphenyl, (lower)alkylphenyl, phen(lower)alkanoyl, halophen(lower)alkanoyl, (lower)alkylphen(lower)alkanoyl, benzoyl, halobenzoyl, (lower)alkylbenzoyl, (lower)alkoxybenzoyl, isonicotinoyl, 2-pyridyl, 3-pyridyl, 4-pyridyl, 2-imidazolyl, 4-imidazolyl, 2-pyrrolyl, 3 - pyrrolyl, phen(lower)alkyl, halophen(lower)alkyl, (lower)alkylphen(lower)alkyl, (lower)alkoxyphen(lower)alkyl, $R_4SO_2$—, wherein $R_4$ is selected from the group consisting of (lower)alkyl, phenyl, halophenyl, (lower)alkoxyphenyl, (lower)alkylphenyl, phen(lower)alkyl, 2-pyridyl, 3-pyridyl and 4-pyridyl; $R_1$ and $R_2$ may be concatenated to form a radical selected from the group consisting of piperidino, morpholino, 4-methylpiperazino, pyrrolidino and 3-methylimmidazolidino; $R_3$ is selected from the group consisting of hydrogen, (lower)alkyl, (lower)alkanoyl, phen(lower)alkanoyl, benzoyl, halobenzoyl, (lower)alkoxybenzoyl, halophen(lower)alkanoyl, (lower)alkylphen(lower)alkanoyl, (lower)alkylphen(lower)alkanoyl, (lower)alkoxyphen(lower)alkanoyl, (lower)alkylbenzoyl, (lower)alkoxybenzoyl; $R_1$ and $R_2$ may both be direct bonds attached to a single radical selected from the group consisting of (lower)alkylidene, benzylidene, phen(lower)alkylidene; and pharmacologically acceptable salts thereof.

2. A compound as defined in claim 1 which is 6-[3-(dimethylamino)ureido]penicillanic acid hemihydrate.

3. A compound as defined in claim 1 which is 6-(3-benzamidoureido)penicillanic acid.

4. A compound as defined in claim 1 which is 6-[3-(isonicotinamido)ureido]penicillanic acid, N-ethylpiperdine salt, hemihydrate.

5. A compound as defined in claim 1 which is 6-[3-(4-methyl-1-piperazinyl)ureido]penicillanic acid.

6. A compound as defined in claim 1 which is 6-[3-benzoyl-3-(isopropylideneamino)ureido]penicillanic acid.

7. A compound as defined in claim 1 which is 6-[3-(p-toluenesulfonamido)ureido]penicillanic acid.

8. A compound of the formula

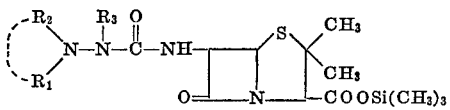

wherein $R_1$ is selected from the group consisting of (lower)alkyl, phenyl, halophenyl, (lower)alkoxyphenyl, (lower)alkylphenyl, (lower)alkylphen(lower)alkyl, (lower)alkoxyphen(lower)alkyl, halophen(lower)alkyl, phen(lower)alkyl, 2-pyridyl, 3-pyridyl, 4-pyridyl, 2-imidazolyl and 4-imidazolyl; $R_2$ is selected from the group consisting of (lower)alkyl, (lower)alkanoyl, phenyl, halophenyl, (lower)alkoxyphenyl, (lower)alkylphenyl, phen(lower)alkanoyl, halophen(lower)alkanoyl, (lower)alkylphen(lower)alkanoyl, benzoyl, halobenzoyl, (lower)alkylbenzoyl, (lower)alkoxybenzoyl, isonicotinoyl, 2-pyridyl, 3-pyridyl, 4-pyridyl, 2-imidazolyl, 4-imidazolyl, 2-pyrrolyl, 3-pyrrolyl, phen(lower)alkyl, halophen(lower)alkyl, (lower)alkylphen(lower)alkyl, (lower)alkoxyphen(lower)alkyl, $R_4SO_2$—, wherein $R_4$ is selected from the group consisting of (lower)alkyl, phenyl, halophenyl, (lower)alkoxyphenyl, (lower)alkylphenyl, phen(lower)alkyl, 2-pyridyl, 3-pyridyl and 4-pyridyl; $R_1$ and $R_2$ may be concatenated to form a radical selected from the group consisting of piperidino, morpholino, 4-methylpiperazino, pyrrolidino and 3-methyl-immidazolidino; $R_3$ is selected from the group consisting of hydrogen, (lower)alkyl, (lower)alkanoyl, phen(lower)alkanoyl, benzoyl, halobenzyl, (lower)alkoxybenzoyl, halophen(lower)alkanoyl, (lower)alkylphen(lower)alkanoyl, (lower)alkylphen(lower)alkanoyl, (lower)alkoxyphen(lower)alkanoyl, (lower)alkylbenzoyl, (lower)alkoxybenzoyl; $R_1$ and $R_2$ may both be direct bonds attached to a single radical selected from the group consisting of (lower)alkylidene, benzylidene, phen(lower)alkylidene.

References Cited

UNITED STATES PATENTS 3,453,264 7/1969 Fosker et al. _____ 260—239.1
3,531,469 9/1970 Bamberg et al. ____ 260—239.1

NICHOLAS S. RIZZO, Primary Examiner

U.S. Cl. X.R.

424—271